(12) United States Patent
Colligan (10) Patent No.: US 8,482,876 B2
(45) Date of Patent: *Jul. 9, 2013

(54) METHOD AND DEVICE FOR HARD DRIVE SHOCK EVENT DETECTION

(75) Inventor: Thomas R. Colligan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,288

(22) Filed: Jan. 25, 2012

(65) Prior Publication Data

US 2012/0281312 A1    Nov. 8, 2012

Related U.S. Application Data

(63) Continuation of application No. 12/217,256, filed on Jul. 2, 2008, now Pat. No. 8,107,183.

(51) Int. Cl.
*G11B 15/18* (2006.01)
*G11B 21/02* (2006.01)
*G11B 33/08* (2006.01)
*G11B 19/20* (2006.01)

(52) U.S. Cl.
USPC ............ 360/69; 360/75; 360/97.19; 318/276

(58) Field of Classification Search
None
See application file for complete search history.

(56) References Cited

U.S. PATENT DOCUMENTS

| | | | |
|---|---|---|---|
| 5,893,048 A | 4/1999 | Pate et al. | |
| 5,936,787 A | 8/1999 | Ohmi | |
| 5,982,573 A | 11/1999 | Henze | |
| 6,222,336 B1 | 4/2001 | McKenzie et al. | |
| 6,405,329 B1 | 6/2002 | Colligan et al. | |
| 6,429,990 B2 | 8/2002 | Serrano et al. | |
| 6,510,014 B2 | 1/2003 | Kikuta et al. | |
| 6,633,454 B1 | 10/2003 | Martin et al. | |
| 6,917,172 B2 | 7/2005 | Brenden et al. | |
| 6,967,804 B1 | 11/2005 | Codilian | |
| 6,999,260 B2 | 2/2006 | Abe et al. | |
| 7,026,781 B2 | 4/2006 | Yamazaki et al. | |
| 7,042,663 B2 | 5/2006 | Shimotono et al. | |
| 7,130,255 B2 | 10/2006 | Smith | |
| 7,143,002 B2 | 11/2006 | Hirano | |
| 7,349,174 B2 * | 3/2008 | Bi et al. | 360/78.09 |
| 7,453,660 B2 | 11/2008 | Tanner | |
| 7,548,036 B2 * | 6/2009 | Washington | 318/456 |
| 7,561,364 B2 | 7/2009 | Shin | |
| 7,627,343 B2 | 12/2009 | Fadell et al. | |
| 7,872,826 B2 * | 1/2011 | Takeda et al. | 360/69 |
| 2007/0253091 A1 | 11/2007 | Jeansonne et al. | |

OTHER PUBLICATIONS

G.H. Jang and S.J. Park, "Sensorless Detection of a Free-Falling Hard Disk Drive by Electromechanical Signal of a Spindle Motor," IEEE Transactions on Magnetics, vol. 41, No. 10, Oct. 2005, pp. 3943-3945.

* cited by examiner

*Primary Examiner* — K. Wong
(74) *Attorney, Agent, or Firm* — Womble Carlyle Sandridge & Rice LLP (57) ABSTRACT

A method and system for sensing the current applied to the motor of a data storage device and determining whether a shock event has occurred by processing the sensed current levels.

20 Claims, 8 Drawing Sheets

METHOD AND DEVICE FOR HARD DRIVE SHOCK EVENT DETECTION

CROSS-REFERENCE TO RELATED APPLICATIONS

This application is a continuation of U.S. patent application Ser. No. 12/217,256 filed Jul. 2, 2008, issued as U.S. Pat. No. 8,107,183 on Jan. 31, 2012, which is hereby incorporated by reference in its entirety.

BACKGROUND

This invention relates to the detection of a shock event associated with a hard drive of a computing device.

Traditional computing devices include non-volatile data storage media. One type of non-volatile media is a hard drive that provides relatively high capacity and long term storage of data. The data may include media files (e.g., songs, video, and pictures), software programs, electronic information, and electronic data or files. Existing hard drives include a one or more data disks where data is magnetically stored. Typically, an armature is moved adjacent to the surface of a disk to read or write data from or to the disk respectively while the disk rotates at a particular speed.

Hard drives can be susceptible to mechanical failure or damage due to a physical shock or vibration. Thus, certain hard drives utilize sensors that detect the physical orientation, surrounding environment, or movement of the hard drive and, thereby, detect the occurrence a shock event. One such sensor is an acceleration sensor. One problem with existing shock sensing mechanisms is that additional components, such as an acceleration sensor, are required to enable shock detection based on surrounding environmental conditions. The additional components can add cost, use limited circuit board space, and increase hard drive circuitry size. Accordingly, there is a need to detect hard drive shock events in a more efficient, less obtrusive, and less costly manner.

SUMMARY

The invention, in various embodiments, addresses deficiencies in the prior art by providing systems, methods and devices that enable the detection of a shock event in a less complex and costly manner without the need for sensing surrounding environmental conditions.

In one aspect, a data storage device includes a computer readable medium, a motor that rotates the computer readable medium, a current source (e.g., motor driver circuit) that drives the motor using a motor current, a current sensor that detects the motor current and outputs a current level signal, and a processor, in communication with the current sensor, that processes the current level signal to determine whether a shock event has occurred.

In one configuration, the processing by the processor includes determining whether the current level signal is equal to or greater than a threshold level corresponding to a shock event. In certain configurations, the storage device includes a data store that stores a library of known threshold levels where each threshold level corresponds to a shock event of a known intensity.

In one feature, shock event intensity is determined by comparing the current level signal to the library of known threshold levels. In another feature, shock event intensity is determined by algorithmically estimating the shock event intensity based on a defined best fit function of the current level signal versus shock event intensity. The function may include at least one of a linear function and a non-linear function. The function may be determined, at least in part, by empirically testing the device over a range of shock event intensities to determine a corresponding range of current level signals (or corresponding changes in current level signals). One approach to measuring shock intensity is to measure gravitational acceleration G applied to a device. The intensity may also include a duration of an applied gravitational acceleration G. One particular shock event intensity may be, for example, 70 Gs over a 40 msec period.

In another configuration, the sensor detects the motor current over a period of time and outputs a plurality of current level signals over a period of time. Thus, the processing may include processing the plurality of current level signals. The processing may include determining a change in the current level between at least two of the plurality of current level signals. The processing may also include determining whether a shock event occurred by determining whether the change in the current level is equal to or greater than a threshold level corresponding to a shock event.

In a further configuration, the processing includes generating a datagram (e.g., plot) of the plurality of current signals over a period of time. Again, the storage device may include a data store for storing a library of known datagrams where each datagram may correspond to a shock event of at least one of a known intensity and duration. The processing may include comparing a generated datagram with the library of known datagrams to identify the shock event. The storage device may be a hard disk drive. The current level signal may be at least one of a current, voltage, information bits, and data packet.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DESCRIPTION

Figure 1:
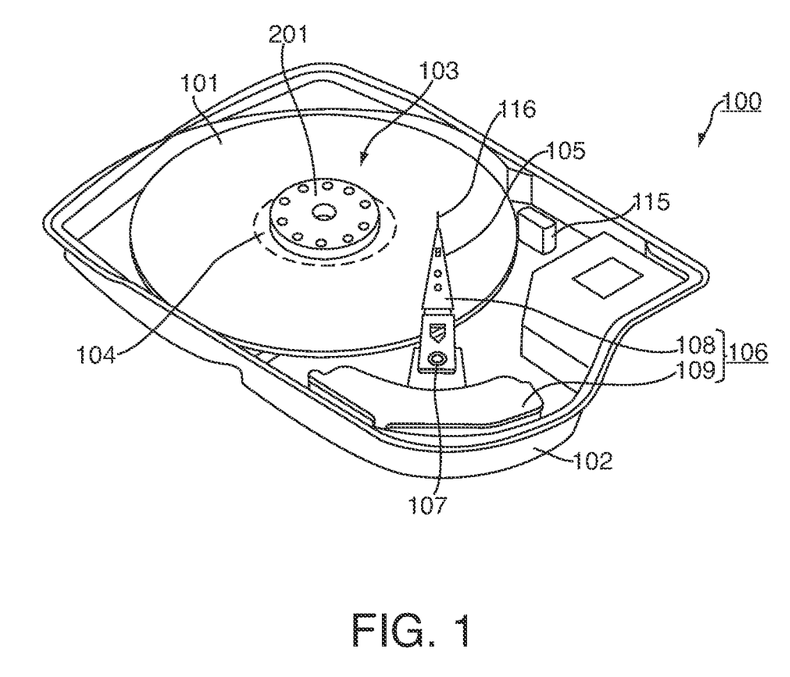
FIG. 1 is a perspective view of a configuration of a hard disk drive 100 according to an illustrative embodiment of the invention.

FIG. 1 is a perspective view of a configuration of a hard disk drive 100 according to an illustrative embodiment of the invention. In FIG. 1, a magnetic disk 101 includes a nonvolatile storage disk that stores data by magnetizing a magnetic layer. The magnetic disk 101 may include an aluminum substrate or a glass substrate. The drive 100 may include a box-shaped base 102 having an opening in its upper part that accommodates components of the hard disk drive 100. In certain embodiments, the base 102 is formed by pressing a magnetic material such as steel. Steel, magnetic stainless steel, or the like, may be used as the magnetic material. By use of a gasket (not shown) such as fluorine rubber, the base 102 may be secured to a cover (not shown) for closing the upper opening of the base 102 to form a disk enclosure. With the components of the hard disk drive 100 sealed, the disk enclosure can accommodate the components.

In one embodiment, a spindle motor 103 is secured to the base 102. A hub 104 may be provided on the spindle motor 103. An actuator 106 may include a head 105 by which data is written to, and/or read from, the magnetic disk 101. The data may be input/output from/to a host computer system in communication with the drive 100. In one embodiment, the head 105 includes a write element for converting an electrical (data) signal into a magnetic field according to data to be stored in the magnetic disk 101. The head 105 may include a read element for converting a magnetic field received from the magnetic disk 101 into an electrical signal. The head 105 may also include a slider on which the write element and/or the read element are formed.

In certain embodiments, the actuator 106 supports the head 105. The actuator 106 may be configured to enable the actuator 106 to pivotally move about a pivoting shaft 107. The actuator 106 may include an actuator arm 108 and a voice coil motor (VCM) 109. The drive 100 may include a ramp mechanism 115 that retracts the head 105 from the magnetic disk 101 when the rotation of the magnetic disk 101 stops. The actuator 106 may include a tab 116 located at the tip of the actuator 106.

By use of a top clamp 201, the magnetic disk 101 may be secured to the hub 104 of the spindle motor 103, which may be secured to the bottom surface of the base 102. The magnetic disk 101 may be driven and rotated by the spindle motor 103 at a given rotational speed. When the hard disk drive 100 is not operated, the magnetic disk 101 can stand still. In response to a driving signal supplied from a controller (not shown) to a flat coil, the VCM 109 can pivotally move the actuator arm 108 about the pivot shaft 107 and, thereby, move the head 105 to a position above the magnetic disk 101 or to the outside of the magnetic disk 101.

A circuit board (not shown) may be mounted to the outside (under surface) of the base 102 or some other surface of the drive 100. The circuit board may include a rectangular shape that covers a portion of the outside of the base 102. The circuit board may provide electrical power for driving a motor such as the spindle motor 103. The circuit board may provide power to a coil used for the VCM 109, provide electrical signaling for reading of the head 105, and/or all electrical signaling and power to enable operation of the drive 100. In one embodiment, the circuit board includes a Flexible Printed Circuit (FPC).

In certain embodiments, the actuator 106 moves the head 105 to a position above a data area of the magnetic disk 101 that is rotating to enable the reading/writing of data from/to the magnetic disk 101. The actuator 106 may pivotally move to cause the head 105 to move in a radial direction on the surface of the magnetic disk 101, permitting the head 105 to access a desired track of the disk 101. By balancing the pressure produced by air viscosity between the rotating magnetic disk 101 and an Air Bearing Surface (ABS) of a slider facing the magnetic disk 101, the head 105 floats off the magnetic disk 101 at a substantially constant gap distance.

The hard disk drive 100 may include a disk drive that is called a load/unload disk drive. If the rotation of the magnetic disk 101 stops, the head 105 contacts the surface of the magnetic disk 101, causing absorption phenomenon. This can produce problems, such as the occurrence of a flaw in the data area, and an inability to rotate the magnetic disk. Thus, when the rotation of the magnetic disk 101 stops, the actuator 106 retracts the head 105 from the data area into the ramp mechanism 115. In certain embodiments, the actuator 106 pivotally moves in the direction toward the ramp mechanism 115, which causes the tab 116 at the tip of the actuator 106 to slide and move on the surface of the ramp mechanism 115 until the tab 116 sits on a parking surface of the ramp mechanism 115. This is how the head 105 is unloaded. When the head 105 is loaded, the actuator 106 supported by the parking surface leaves the ramp mechanism 115 and then moves above the surface of the magnetic disk 101. For the Contact Start and Stop (CSS) hard disk drive, the head 105 retracts into a CSS zone on the inner circumference side of the magnetic disk 101.

Although the illustrated hard disk drive 100 includes one magnetic disk 101, the hard disk drive 100 may include a plurality of magnetic disks. For example, if data is stored on both sides of a plurality of magnetic disks, the plurality of magnetic disks can be integrally held by the hub 104 at given intervals in a direction of the rotating shaft of the spindle motor 103. A plurality of actuator arms may be used for holding a plurality of heads that can, in turn, scan each storing surface. Thus, the number of the actuator arms may be equal to the number of the storing surfaces. The actuator arms may be secured to the actuator 106 at positions where they overlap one another at given intervals from the actuator arms 108.

Figure 2:
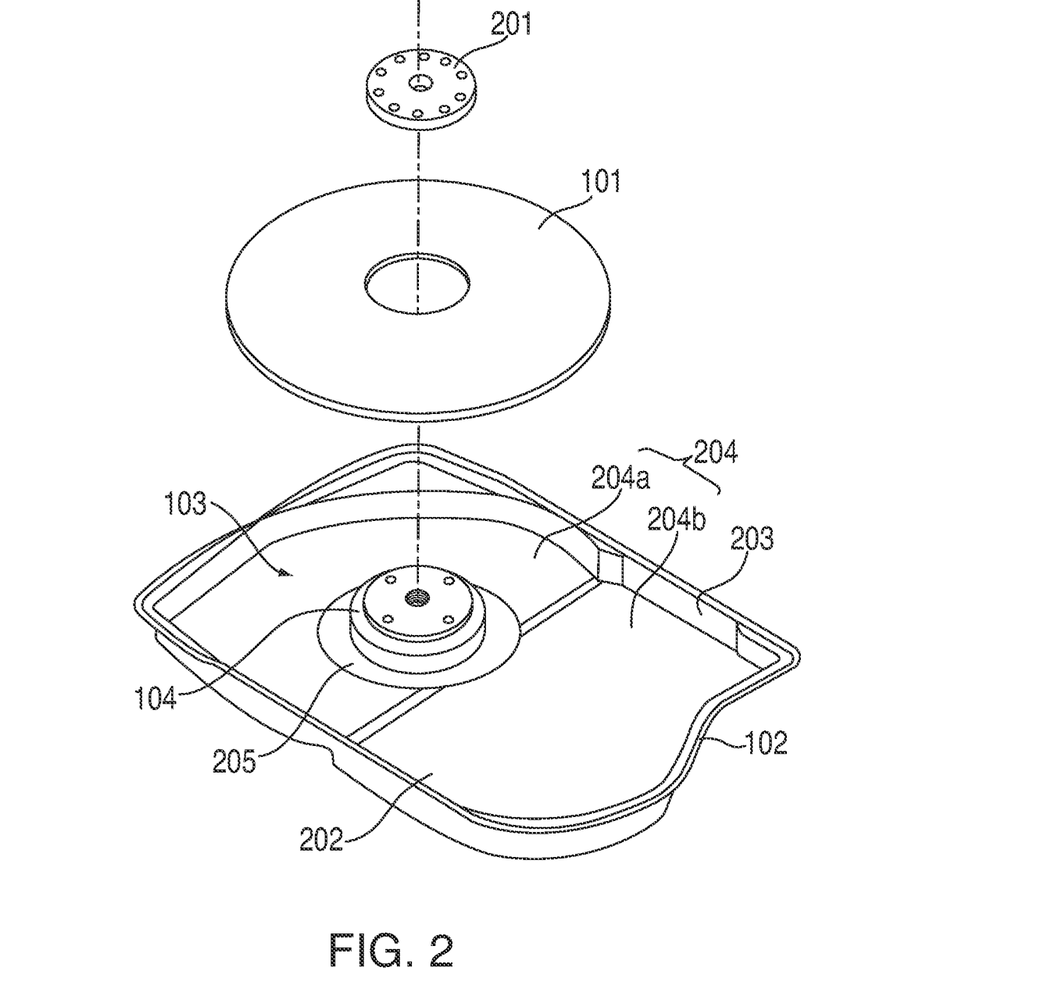
FIG. 2 is an exploded perspective view of a configuration of the hard disk drive 100 according to an illustrative embodiment of the invention.

FIG. 2 is an exploded perspective view of a configuration of the hard disk drive 100 according to an illustrative embodiment of the invention. FIG. 2 shows the alignment of the base 102, the spindle motor 103, the magnetic disk 101, and the top clamp 201 within the hard disk drive 100. As shown in FIG. 2, the base 102 may include a bottom 202 to which the components of the hard disk drive 100 can be mounted and a wall 203 that surrounds the circumference of the bottom 202.

The drive 100 may include an inside-the-base space 204 that is surrounded by the wall 203. The space 204 may include a plurality of areas such as a disk accommodation area 204a that accommodates a disk assembly including the magnetic disk 101 and the spindle motor 103. The space may include an actuator accommodation area 204b that accommodates the actuator 106 used to move the head 105 to a desired position above the magnetic disk 101 or to a desired position away from the magnetic disk 101.

The spindle motor 103 may be positioned in a concave part 205 that is formed substantially in the center of the bottom 202 of the disk accommodation area 204a in a direction from the inside to the outside of the base 102. The spindle motor 103 may be secured to the bottom 202 of the base 102 at this position. The magnetic disk 101 may be mounted on the hub 104 of the spindle motor 103. Both the top clamp 201 and the hub 104, which may be screwed, can hold the magnetic disk 101 securely, so that the magnetic disk 101 is secured to the spindle motor 103.

The base 102 which may be formed by pressing a magnetic material plate such as cold reduced carbon steel (SPCC). For the presswork, a member can be pressed using a pressing machine. In certain embodiments, punching, die forging, plate bending, or the like, are performed. The presswork enables a metal plate, made by rolling, to be shaped into a desired form. A plate may be formed using a mold. Punching, drilling, drawing, bending, and the like, are known as a processing method that may be employed to shape a metal plate. The presswork is easier than casting and, therefore, may be desirable and more cost effective.

In certain embodiments, the spindle motor 103 includes a fluid dynamic bearing (FDB) motor. The fluid dynamic bearing motor may include a motor in which fluid such as oil is used for a bearing of a rotating shaft. In the bearing, only fluid exists between a rotating unit and a fixed unit, allowing the rotating unit to rotate smoothly. A fluid dynamic bearing motor contributes to a longer life of the motor as compared with a ball bearing motor. A fluid dynamic bearing motor is also superior in providing silent or low noise operation. A fluid dynamic bearing motor can reduce oscillations by use of a damping effect on high order oscillations. The fluid dynamic bearing motor, for certain applications, can provide superior positioning accuracy. In one embodiment, the spindle motor 103 has an in-hub structure that includes a stator and a rotor magnet. Additionally, the spindle motor 103 may include an axial rotation structure in which a rotating shaft is secured to the rotating hub side.

While the spindle motor 103 described above is the in-hub type spindle motor that accommodates the stator and the magnet unit inside the hub, the spindle motor 103 may include other types of spindle motors such as an inner rotor type spindle motor in which a magnet unit is firmly fixed to the circumference of a hub and a stator is placed outside the hub. The spindle motor 103 may include an axial rotation type spindle motor in which a shaft rotates together with a rotor and/or includes a spindle motor having a shaft fixing structure in which a shaft is secured to the base. The present invention can be applied not only to hard disk drives, but also to various types of storage disk drives for driving and rotating a storage disk for storing data, such as an optical disk drive.

A hard drive may have a size, without limitation, of about or less than 3.5", 2.5", 2", 1.8", 1", 0.5", and 0.25". One example of a miniature hard drive is the 1"-6 Giga-byte (GB) or 8 GB Microdrive 3K8, made by Hitachi, Ltd. of Tokyo, Japan. A hard drive may include a hard drive controller such as, without limitation, the ST HDD motor controller family (e.g., L7207) made by STMicroelectronics of Geneva, Switzerland. A hard drive and/or hard drive controller may utilize a protocol to communicate with a host computer system or other device such as, without limitation, the ATA command set.

Figure 3:
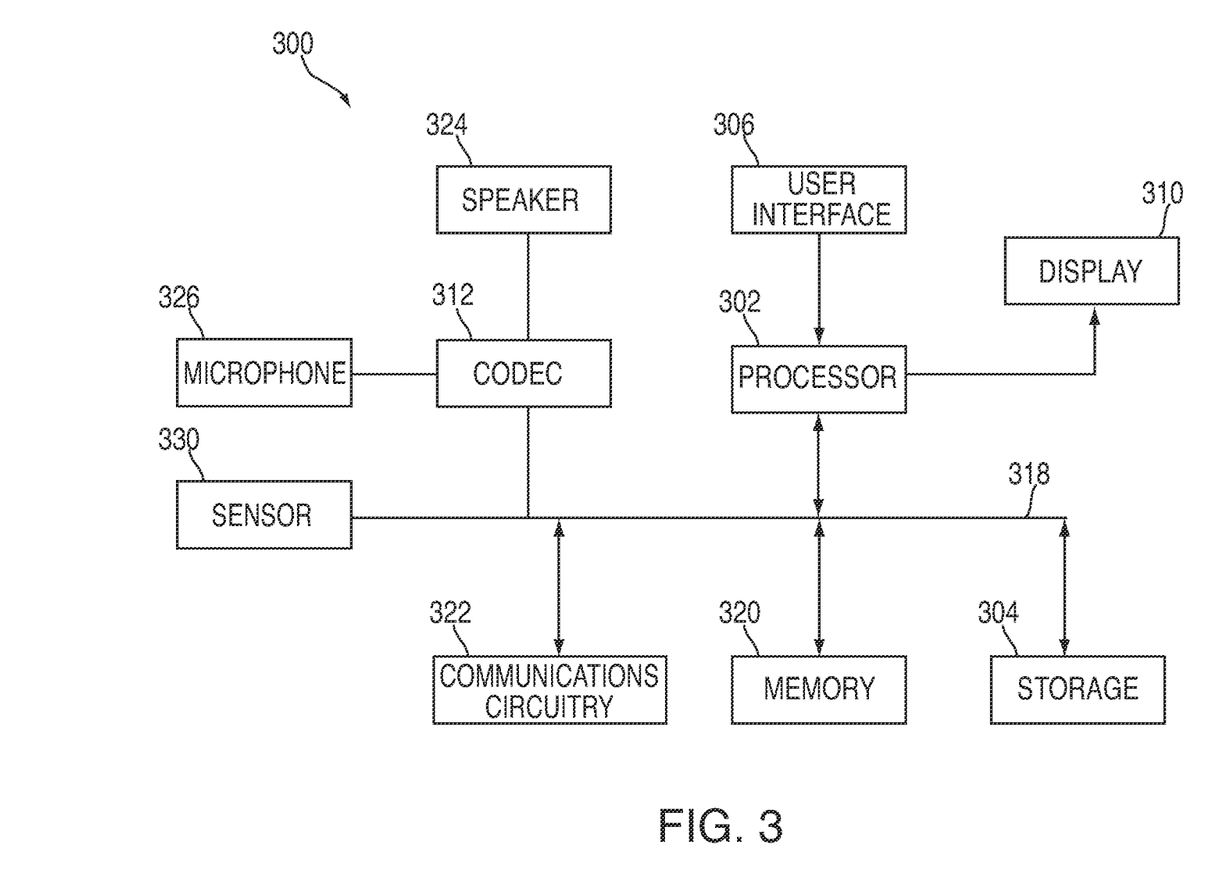
FIG. 3 shows a simplified functional block diagram of a computer system according to an illustrative embodiment of the invention.

FIG. 3 shows a simplified functional block diagram of a computer system or device 300 according to an illustrative embodiment of the invention. The block diagram provides a generalized block diagram of a computer system such as may be employed, without limitation, by the hard drive 100, media device 500 and desktop computer system 600. The computer system 300 may be representative of a host computer system that is in communication with a hard drive such as hard drive 100. Alternatively, the computer system 300 may be representative of a computer architecture for a hard drive itself, such as the hard drive 100. Thus, a hard drive can support its own processing environment and utilize its own computer system to perform functions such as, without limitation, control the operation of a disk motor, control communications to and from the hard drive, monitor the performance of the hard drive, perform diagnostic testing or recordings of the hard drive, and control data write and read operations.

The computer system 300 may include a processor 302, storage device 304, user interface 308, display 310, CODEC 312, bus 318, memory 320, communications circuitry 322, a speaker or transducer 324, a microphone 326, and a sensor 330. Processor 302 may control the operation of many functions and other circuitry included in the computer system 300. Processor 302 may drive display 310 and may receive user inputs from the user interface 308. In the instance where the computer system 300 controls the operation of a hard drive, a display 310, speaker 324, microphone 326, and user interface 306 may not utilized.

Storage device 304 may store media (e.g., music and video files), software (e.g., for implanting functions on device 300), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 312 may be included to convert digital audio signals into an analog signals for driving the speaker 324 to produce sound including voice, music, and other like audio. The CODEC 312 may also convert audio inputs from the microphone 326 into digital audio signals. The CODEC 312 may include a video CODEC for processing digital and/or analog video signals.

User interface 308 may allow a user to interact with the computer system 300. For example, the user interface 308 can take a variety of forms, such as a button, keypad, dial, a click wheel, or a touch screen. Communications circuitry 322 may include circuitry for wireless communication (e.g., short-range and/or long range communication). For example, the wireless communication circuitry may be Wi-Fi enabling circuitry that permits wireless communication according to one of the 802.11 standards. Other wireless network protocols standards could also be used, either in alternative to the identified protocols or in addition to the identified protocol. Other network standards may include Bluetooth, the Global System for Mobile Communications (GSM), code division multiple access (CDMA), and long-term evolution (LTE) based wireless protocols. Communications circuitry 322 may also include circuitry that enables the computer system 300 to be electrically coupled to another device (e.g., another computer or an accessory device) and communicate with that other device.

In the instance where the computer system 300 is representative of a computer architecture for a hard drive, the sensor 330 may be a current sensor that monitors the amount of current used to drive one or more disk motors of the hard drive. In the instance where the computer system 300 is representative of a personal computer (e.g., desktop computer) or media device 500, the storage 304 may be a hard drive such as hard drive 100.

A computing system or device 300 may include any system or device that uses a processor to perform electronic computations or operations. A computing system may include a mainframe, server, workstation, hand-held computing device, wireless communications device, personal computing device, and the like. A computing system or device may include any computing device or computer-controlled device capable of interacting or interfacing with a person. Types of computing devices may include personal computers, consumer electronics, personal media devices, personal communications devices, personal display devices, vehicle control systems, financial transactions systems, and any like computing device capable of interfacing with a person.

Consumer electronic devices may include, without limitations, televisions, stereo systems, video gaming systems, disk players, cameras, video cameras, and task-specific computing devices. Personal computers may include, without limitation, desktop computers, laptop computers, portable computers, workstations, server interfaces, and handheld computers. Media devices may include, without limitation, cellular telephones, MP3 players, portable video players, media capable cellular telephones, and satellite media players. Personal communications devices may include wireless communications devices, cellular telephones, satellite phones, personal digital assistants (PDA), and other like communications devices. Vehicle control systems may include, without limitation, consumer electronic devices, personal media devices, personal communication devices, vehicle operating systems, and vehicle monitoring systems. Financial transaction systems may include, without limitation, automatic teller machines (ATM), store purchase/check-out systems, credit card transaction systems, and remote purchase systems.

Figure 4A:
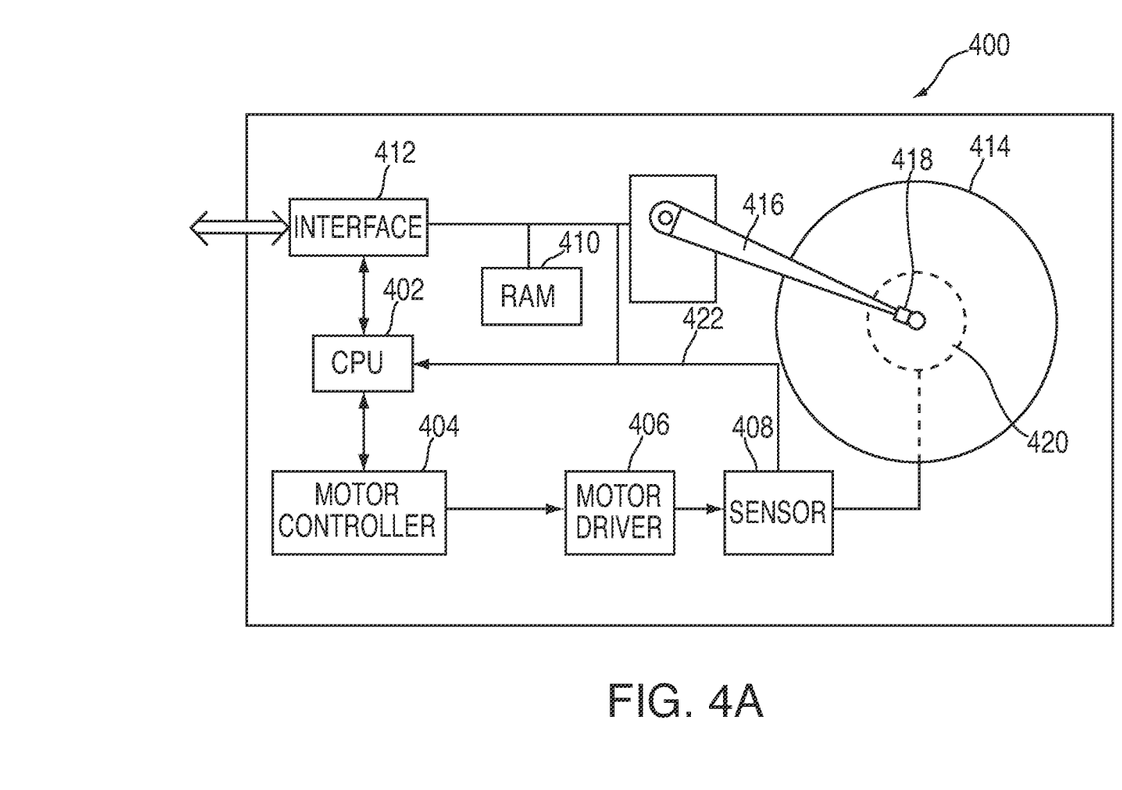
FIG. 4A shows a diagram of a storage device according to an illustrative embodiment of the invention.

FIG. 4A shows a diagram of a storage device 400 according to an illustrative embodiment of the invention. In one embodiment, the storage device 400 is an intelligent storage device including a processor 402, a motor controller 404, a motor driver 406, a current sensor 408, a memory 410, a communications interface 412, at least one computer readable medium 414 (e.g., a magnetic disk), an actuator 416, a read/write head 418, and/or a disk motor 420. A bus 422 may interconnect interface 412, read/write head 418, RAM 410, and/or the sensor 408. The interface 412 may enable electronic communications between the storage device 400 to a host, such as computer system 300 of FIG. 3.

In one embodiment, the interface 412 routes information and/or data to and from the at least one computer readable medium 414. The interface 412 may also include an embedded processor 402 with suitable firmware for logging certain characteristic operational information, controlling the hard drive operations, controlling read/write operations, receiving sensor 408 signals, and analyzing sensor 408 signals. The device 400 may include a motor controller 404 that controls the operation of the motor driver 406 and motor 420. One operation may be to regulate the rotation speed of the medium 414. In one embodiment, the processor 402 and motor controller 404 functions are integrated into a single chip or element. In certain embodiments, at least one non-volatile buffer is located in a reserved area of the at least one computer readable medium 414. For example, the at least one buffer may include an error data, timestamp data, hard drive ID data, host system configuration data, hard drive status data, and shock event detection data.

In certain embodiments, the sensor 408 includes a current sensor that measures the drive current from the motor driver 406 to the motor 420. By measuring the motor drive current or motor drive signal, the sensor 408 can detect certain events, such as shock events that can effect the motor drive signal. For example, when the device 400 is subjected to a shock (e.g., the device is dropped), the physical shock can cause the motor 420 to slow down. The slow down can, in turn, cause an interruption to the current flow from the motor driver 406 to the motor 420. The slow down of the motor 420 will further cause an increase in current demand by the motor 420 to return the medium 414 back to its selected and/or regulated rotation speed (e.g. 7200 RPM).

Under the Constant Power Law and related principles, the total power input into a system must be equal to the total power output from a system. In the case of a hard drive motor where the motor is capable of delivering a rated power output, the output power capacity of the combination of the motor and an associated coupling device (provided that the coupling device is appropriately rated) is the rated motor power minus the loss of power due to the coupling device. Torque T is directly proportion to power and inversely proportional to speed of the motor. Thus, Torque can be measured by the following formula:

$$T = K \times P/N \quad (1)$$

where K is a constant, P is power, and N is rotation speed. In the case of a FDB motor, the constant power law applies, but the power in the driven load may be reduced as the speed increases.

If a drive with a FDB motor, e.g., motor 420, is physically shocked, the motor 420 will slow down. This, in turn, causes an interruption to the drive current flow to the motor 420, which causes an increase in current demand to return the medium 414 back to its selected steady-state speed and/or RPM.

By measuring the change in current using the current sensor 408, the processor 402 (or processor 302 of FIG. 3) can correlate and/or determine the severity and/or intensity of the shock event. The detection of a shock event and determination of the severity of the shock event can enable the processor 402 or host computer system to perform an operation in response to the detected shock event. For example, the processor 402 may take actions to protect certain data not yet written to the medium 414. One action may be to store certain data in the memory 410 until a diagnostic check is performed on the medium 414. Another action may include storing shock event data in the memory 410 or medium 414 to memorialize the shock event for later analysis. The shock event data may include, without limitation, the peak current, event current profile, shock intensity, shock intensity profile, timestamp data, event start time, and/or event end time. In one embodiment, the motor current may be recorded and/or represented as a voltage or other like current detection signal. An event current profile may include a datagram showing current intensity over a period of time such as the shock event time period.

In certain embodiments, the processor 402 and/or an external processor of a host system may include an algorithm or formula for correlating a detected current level or intensity with a corresponding shock intensity. In one embodiment, the correlation of current level, current level change, and/or current level event profile with shock intensity is determined by empirical testing and/or experimental analysis. The processor 402 may use a look up table that associates current levels, current level changes, and/or current level profiles with shock intensity. The processor 402 may determine the shock intensity based on a closest match with a known current level in the look up table. The processor 402 may use a linear and/or non-linear formula or function that provided a best fit prediction of shock intensity for a detected current signal. The correlation of motor drive current or motor drive current change to the intensity of a shock event may be determined based on the type of hard drive, the manufacturer and type of the hard drive, the type and model of hard drive, the manufacturing origin of the hard drive, the components of the hard drive, and/or on an individual drive basis.

Figure 4B:
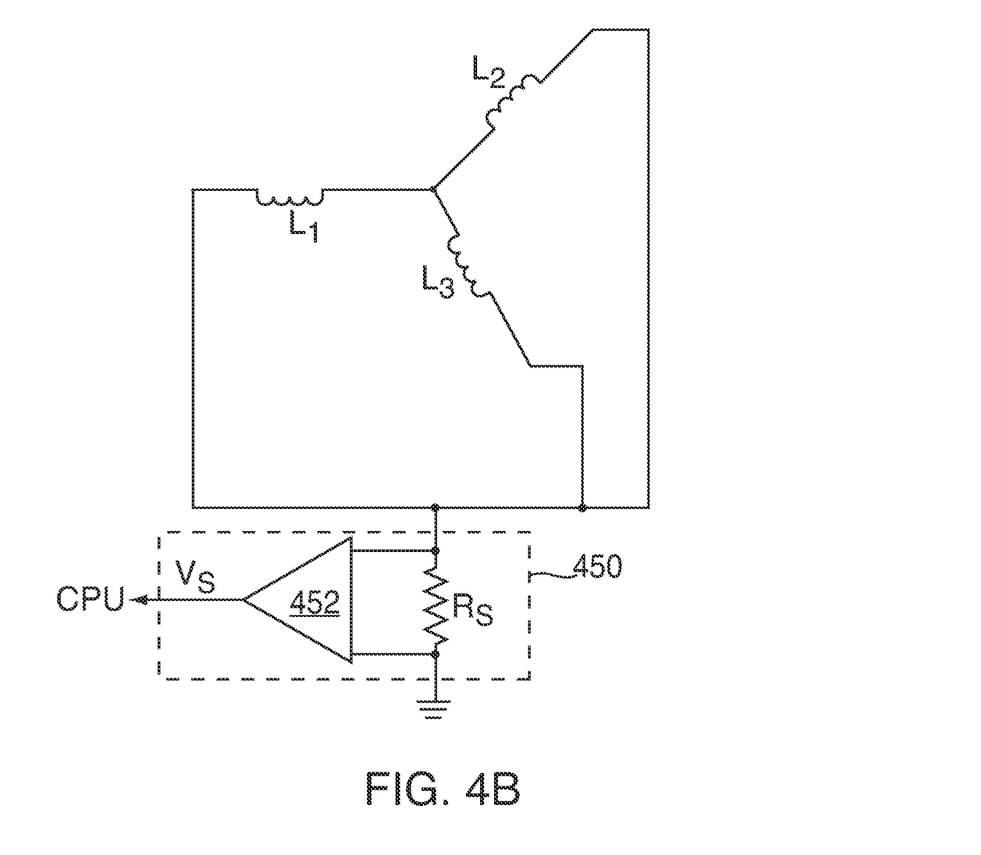
FIG. 4B shows a simplified diagram of an exemplary current sensor according to an illustrative embodiment of the invention.

FIG. 4B shows a simplified diagram of an exemplary current sensor 450 according to an illustrative embodiment of the invention. The sensor 450 includes a current sensing resistor Rs and a current sensing amplifier 452. In one embodiment, the resistor Rs is in electrical series with the stator coils L1, L2, and L3 of a three phase spindle motor such as, for example, motor 420. Thus, the current flow through Rs generates a voltage that is proportional to the motor current flow to the stator coils L1, L2, and L3. The amplifier 452 measures the voltage drop across Rs and outputs a current sensing signal and/or voltage Vs that is provided to the processor 402.

The processor 402 may then process the current sensing signal to determine the shock intensity associated with a shock event. Further details regarding this type of current sensor are provided in U.S. Pat. No. 6,917,172, the entire contents of which are incorporated herein by reference. It should be understood, however, that other types of known current sensors may be employed.

In certain embodiments, a shock threshold may be defined based on a maximum acceptable shock intensity whereby no corrective action or safeguards are required for the device 400. The threshold may include a motor current or motor current change threshold associated with the maximum acceptable shock intensity.

Any number of operations may be performed by the device 400 upon detection of a shock event. For example, the device may provide an alert or notification to an external device, such as a host computer system, that a shock event has occurred. The host computer system could perform any number of operations in response to the notification such as, without limitation: suspend read and/or write operations with the device 400; switch read and/or write operations to another storage device; perform a diagnostic operation to determine whether the device 400 has been damaged or any data has been corrupted; and/or provide a shock event notification to a service entity or system user to replace the device 400.

The device 400 could perform any number of operations in response to the detection of a shock event by the processor 402 including, without limitation: suspend read/write operations; initiate an internal diagnostic routine or error check of the device's hardware and/or the data on the medium 414; switch read/write operations to another disk; provide notification of a shock event to an external source; memorialize the shock event by storing shock event data in a select memory such as on the medium 414; and/or provide shock event data to an external source, e.g., a test technician, upon request.

Certain existing hard drives are currently manufactured with a motor current sensor to enable, for example, regulation and control of medium rotation speed. One advantage of the present invention is that an existing hard drive may be configured with additional firmware and/or software to enable its processor to perform shock event detection and analyses using existing device hardware without the need to add, for example, a current sensor circuit.

The device 400 may be manufactured such that the device 400 supports one or more hard drive standards such as, without limitation, ATA, SCSI, and like standards. In certain embodiments, the interface 412 supports protocols and provides mechanisms that enable the device 400 to communication with a host system or other devices. The device 400 may support self-monitoring, analysis, and reporting technology (SMART) to assist in failure analysis prior to sending a hard drive back to the manufacturer.

Figure 5:
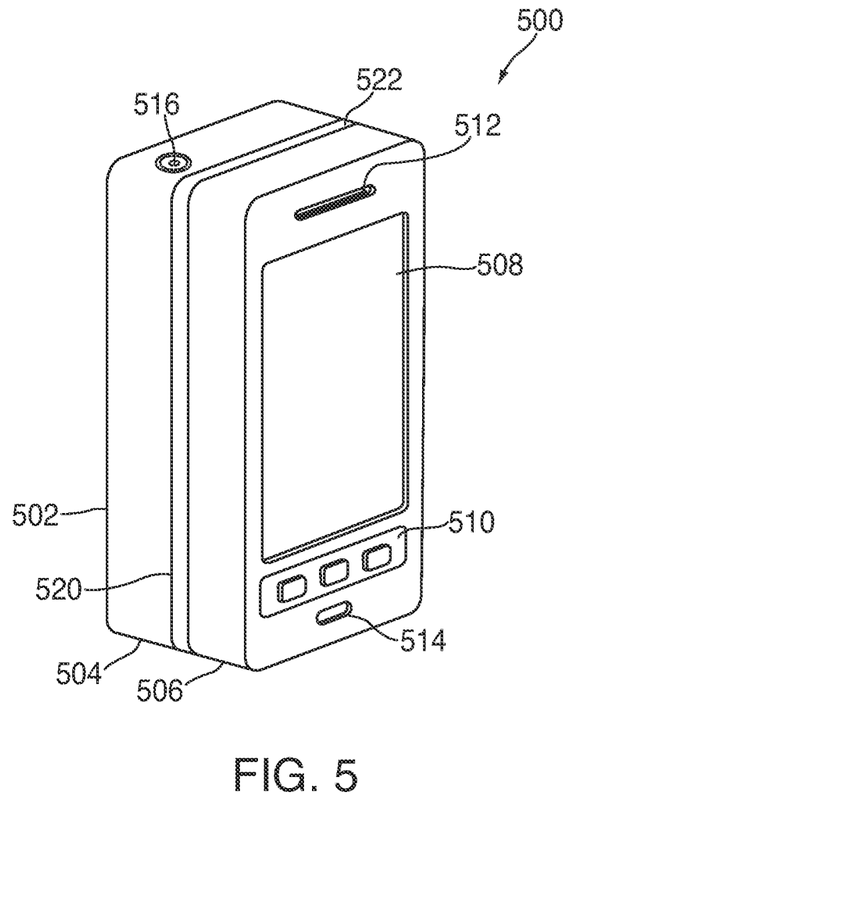
FIG. 5 is a perspective view of a media device according to an illustrative embodiment of the invention.

FIG. 5 is a perspective view of a media device 500 according to an illustrative embodiment of the invention. The device 500 includes a housing 502, a first housing portion 504, a second housing portion 506, a display 508, a keypad 510, a speaker housing aperture 512, a microphone housing aperture 514, a headphone jack 516, and frame sidewall 522. In certain embodiments, the frame sidewall 522 is the exposed portion of a frame residing within or adjacent to the housing 502 that provides structural support for the media device 500 and various internal components. The media device may include a computer architecture such as shown in FIG. 3 and, therefore, include a storage device such as storage device 400.

In one embodiment, the housing 502 includes a first housing portion 504 and a second housing portion 506 that are fastened together and/or to the frame sidewall 522 to encase various components of the media device 500. The housing 502 and its housing portions 504 and 506 may include polymer-based materials that are formed by, for example, injection molding to define the form factor of the media device 500. In one embodiment, the housing 502 surrounds and/or supports internal components such as, for example, a display 508, one or more circuit boards having integrated circuit components, internal radio frequency (RF) circuitry, an internal antenna, a speaker, a microphone, a hard drive, a processor, and other components. Further details regarding certain internal components are discussed herein with respect to FIG. 3. The housing 502 provides for mounting of a display 508, keypad 510, external jack 516, data connectors, or other external interface elements. The housing 502 may include one or more housing apertures 112 to facilitate delivery of sound, including voice and music, to a user from a speaker within the housing 502. The housing 502 may include one or more housing apertures 514 to facilitate the reception of sounds, such as voice, for an internal microphone from a device user.

Computing devices and/or media devices of this type may include a touchscreen remote control, such as a Pronto made available by Royal Philips Electronics of the Netherlands or a handheld GPS receiver made available by Garmin International, Inc. of Olathe, Kans. In certain embodiments, the display 508 includes a graphical user interface (GUI) to enable a user to interact with the device 500. The personal computing device 500 may also include an image sensor such as a camera capable of capturing photographic images and/or video images.

In one embodiment, a computing device may be a portable computing device or media device 500 dedicated to processing media such as audio and video. The media device 500 may include a media player (e.g., MP3 player), a game player, a remote controller, a portable communication device, a remote ordering interface, an audio tour player, or other suitable personal device. The media device 500 may be battery-operated and highly portable so as to allow a user to listen to music, play games or video, record video or take pictures, communicate with others, and/or control other devices. In addition, the media device 500 may be sized such that it fits relatively easily into a pocket or hand of the user. By being handheld, the media device 500 is relatively small and easily handled and utilized by its user and thus may be taken practically anywhere the user travels.

The media device 500 may also be integrated within the packaging of other devices or structures such a vehicle, video game system, appliance, clothing, helmet, glasses, wearable apparel, stereo system, entertainment system, or other portable devices. In certain embodiments, device 500 may be docked or connected to a wireless enabling accessory system (e.g., a wi-fi docking system) that provides the device 100 with short-range communicating functionality. Alternative types of devices 500 may include, for example, a media player such as an iPod® or iPhone that are made available by Apple® Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 500 may synchronize with, for example, a remote computing system or server to receive media (using either wireless or wireline communications paths) or to provide shock event data to the remote computing system. Wireless syncing enables the device 500 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the device 500. In certain embodiments, media and/or data is "downloaded" to the device 500. In other embodiments, the device 100 is capable of uploading media to a remote host or other client system. Further details regarding the capabilities of certain embodiments of the device 500 are provided in U.S. Pat. No. 7,627,343, the entire contents of which are incorporated herein by reference.

Figure 6:
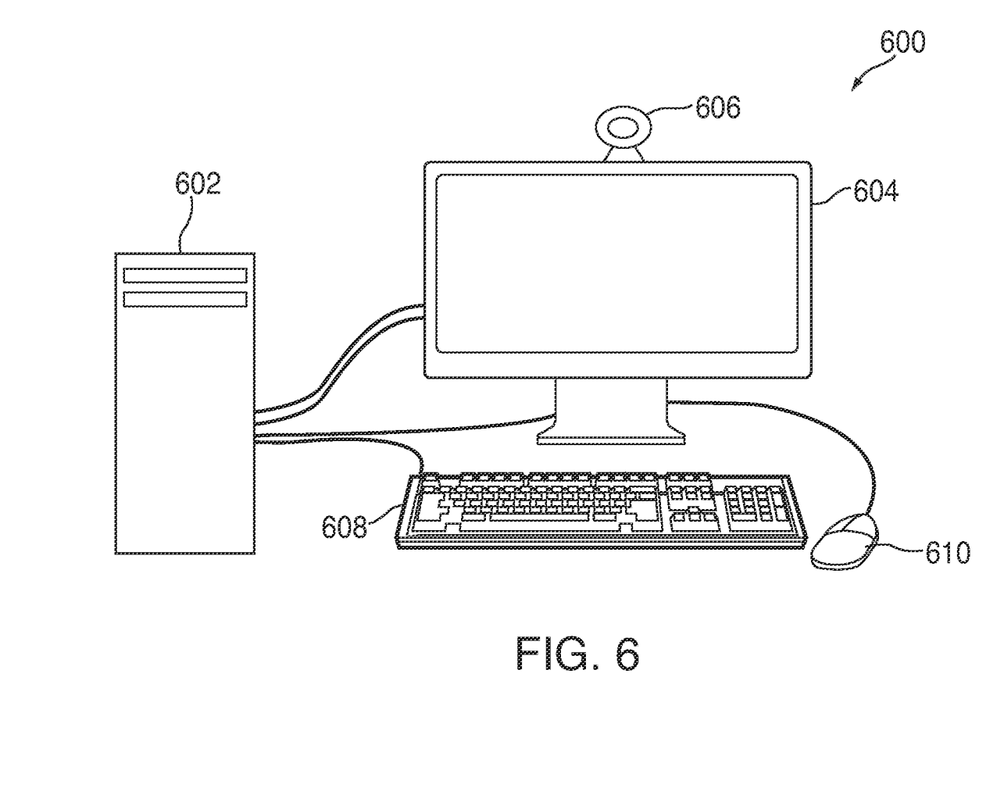
FIG. 6 is a perspective view of a personal computer system according to an illustrative embodiment of the invention.

FIG. 6 is a perspective view of a personal computer system 600 in the form of a desktop personal computer (PC) according to an illustrative embodiment of the invention. In this embodiment, as opposed to the embodiment of FIG. 1A, the PC system 600 includes a computing system housing 602, a display assembly 604, a camera 606, keyboard 608, and pointer device 610, e.g., a mouse. The system 600 may include a computer architecture such as shown in FIG. 3. Thus, the system 600 may include a hard drive such as hard drive 100 of FIG. 1.

Figure 7:
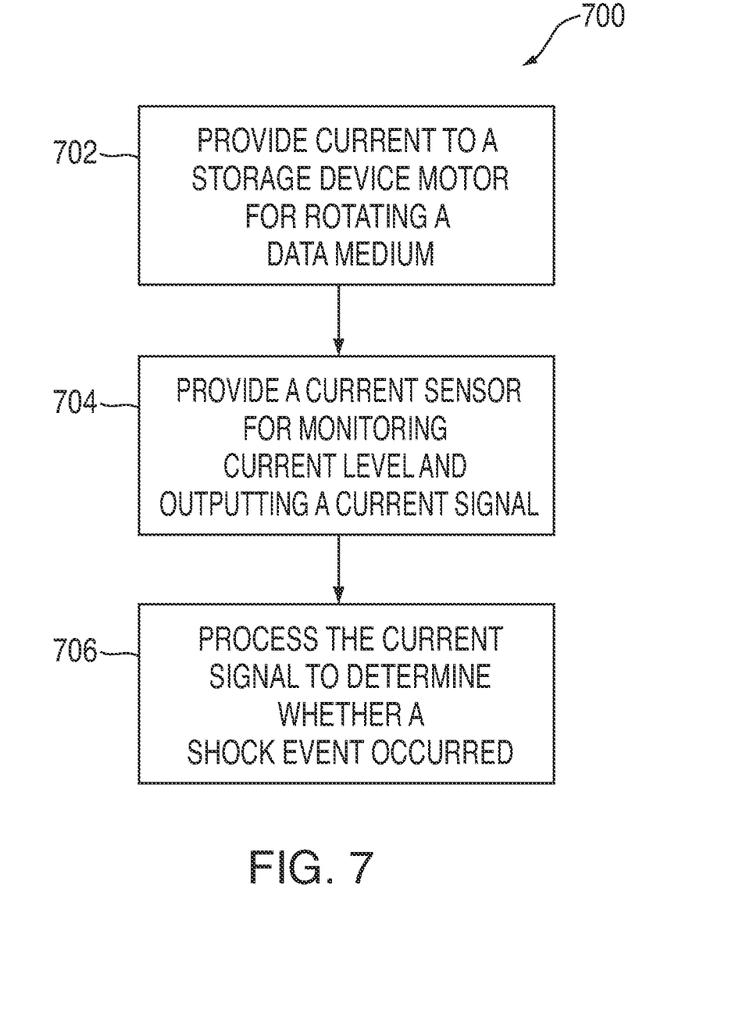
FIG. 7 is a flow diagram of a process for detecting a shock event according to an illustrative embodiment of the invention.

FIG. 7 is a flow diagram of a process 700 for detecting a shock event according to an illustrative embodiment of the invention. First, a motor driver 406 provides current to the motor 420 to enable rotation of the medium 414 at a desired speed (Step 702). Then, the current sensor 408 monitors the current level and outputs a current signal (Step 704). The current signal may include a current level, a set of current levels, a datagram or plot of current level over a period of time, a change in current level, a set of changes in current level, a datagram of changes in current level over a period of time. Next, the processor 402 processes the current signal to determine whether a shock event occurred (Step 706). The processor 402 may continuously or periodically receive a current signal from the sensor 408. As part of the processing, the processor 402 may collate a set of current levels, determine a datagram or plot of current level over a period of time, determine a change in current level, determine a set of changes in current level, and/or determine a datagram of changes in current level over a period of time.

It will be apparent to those of ordinary skill in the art that methods involved in the present invention may be embodied in a computer program product that includes a computer usable and/or readable medium. For example, such a computer usable medium may consist of a read only memory device, such as a CD ROM disk or conventional ROM devices, or a random access memory, such as a hard drive device or a computer diskette, or transportable memory device having a computer readable program code stored thereon.

From the foregoing description, persons skilled in the art will appreciate that the various configurations described herein may be combined without departing from the present invention. It will also be recognized that the invention may take many forms other than those disclosed in this specification. Accordingly, it is emphasized that the invention is not limited to the disclosed methods, systems and devices, but is intended to include variations to and modifications thereof which are within the spirit of the following claims.

What is claimed is:

1. A system comprising:
    a spindle motor that rotates a computer readable medium;
    a driver that provides a drive current to the spindle motor for driving the spindle motor to rotate the computer readable medium;
    a sensor that:
        receives the drive current for driving the spindle motor from the driver; and
        provides an output signal based on the received drive current; and
    a processor that processes the output signal for detecting a shock event.

2. The system of claim 1, wherein the driver provides the drive current to the spindle motor for rotating the spindle motor.

3. The system of claim 2, wherein rotation of the spindle motor rotates the computer readable medium.

4. The system of claim 1, wherein the sensor monitors the received drive current, and wherein the sensor provides the output signal based on the monitored drive current.

5. The system of claim 1, wherein the processor processes the output signal by determining whether the output signal is one of equal to and greater than a threshold level corresponding to the shock event.

6. The system of claim 1, further comprising a data store that stores a library of known threshold levels, wherein each threshold level of the known threshold levels corresponds to a respective shock event of a known intensity, and an intensity of the detected shock event is determined by comparing the output signal to one or more of the known threshold levels.

7. The system of claim 1, wherein the sensor receives the drive current from the driver over a first period of time and provides the output signal as a plurality of output signals over a second period of time.

8. The system of claim 7, wherein the processor processes the plurality of output signals for detecting the shock event.

9. The system of claim 8, wherein the processor determines a change in a level between at least two of the plurality of output signals for detecting the shock event.

10. The system of claim 9, wherein the processor detects the shock event by determining whether the change in the level is one of equal to and greater than a threshold level corresponding to the shock event.

11. A method comprising:
    providing a drive current from a driver;
    receiving the drive current from the driver at a spindle motor
    driving the spindle motor to rotate a computer readable medium using the drive current received at the spindle motor;
    receiving the drive current from the driver at a sensor;
    generating an output signal with the sensor based on the drive current received at the sensor;
    receiving the output signal from the sensor at a processor;
    processing the received output signal with the processor; and
    detecting a shock event based on the processing.

12. The method of claim 11, wherein the driving the spindle motor comprises rotating the spindle motor, and wherein the rotating the spindle motor rotates the computer readable medium coupled to the spindle motor.

13. The method of claim 11, wherein the processing comprises comparing the received output signal with at least one value of a plurality of values stored in a table that is accessible by the processor.

14. The method of claim 13, wherein each value of the plurality of values is associated with a known shock intensity, and an intensity of the detected shock event is determined by comparing the received output signal with at least one value of the plurality of values.

15. The method of claim 13, wherein the table is associated with a characteristic of the spindle motor.

16. The method of claim 11, wherein the receiving the drive current from the driver at the sensor comprises receiving the drive current from the driver at the sensor over a first period of time, and wherein the generating the output signal comprises generating a plurality of output signals with the sensor over a second period of time based on the drive current received at the sensor over the first period of time.

17. The method of claim 16, wherein:
the receiving the output signal from the sensor at the processor comprises receiving the plurality of output signals; and
the processing the received output signal with the processor comprises processing the plurality of received output signals with the processor.

18. The method of claim 17, wherein the processing comprises determining a change in a level between at least two of the plurality of received output signals.

19. The method of claim 18, wherein the detecting the shock event comprises determining whether the change in the level is one of equal to and greater than a threshold level corresponding to the shock event.

20. Non-transitory computer-readable media for controlling an electronic device, comprising computer-readable code recorded thereon for:
providing a drive current from a driver to a spindle motor that rotates a storage disk;
receiving the drive current from the driver with a sensor;
providing an output signal based on the received drive current from the sensor to a processor;
processing the output signal with the processor; and
detecting a shock event based on the processing.

* * * * *